No. 798,372. PATENTED AUG. 29, 1905.
G. M. WELSH.
PROPELLER WHEEL.
APPLICATION FILED OCT. 21, 1904.
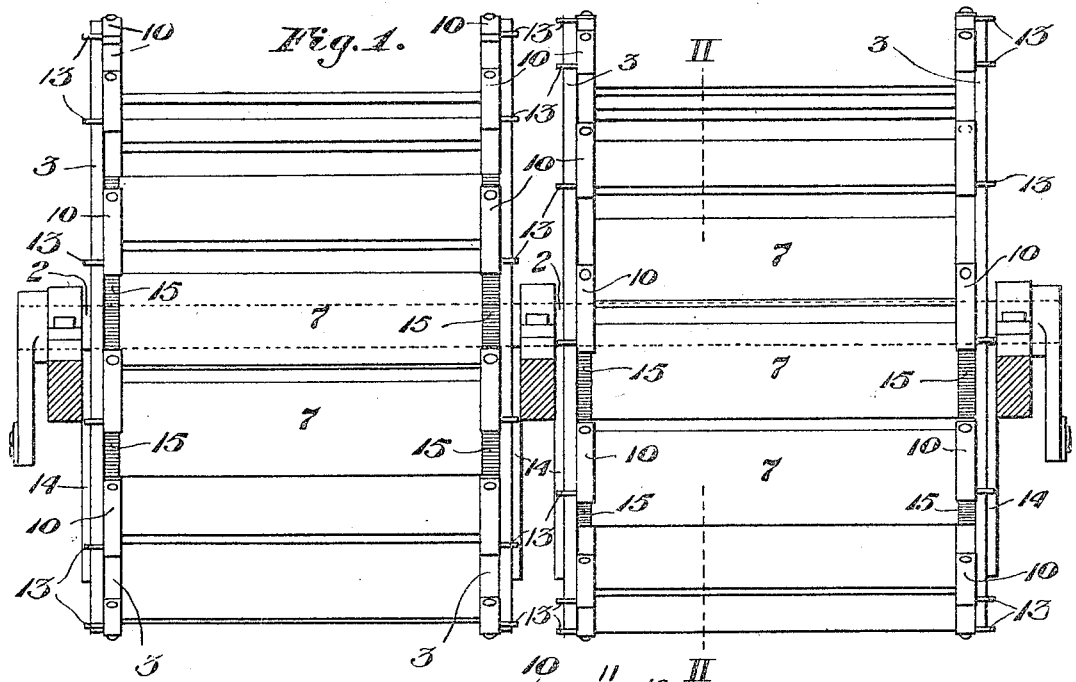
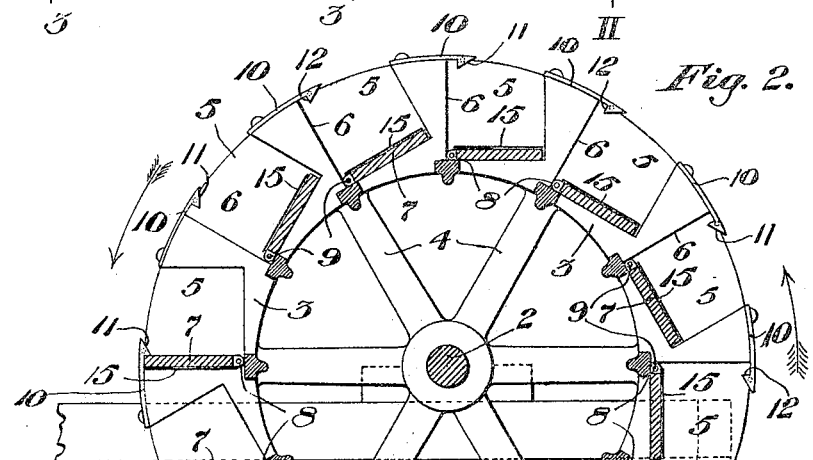
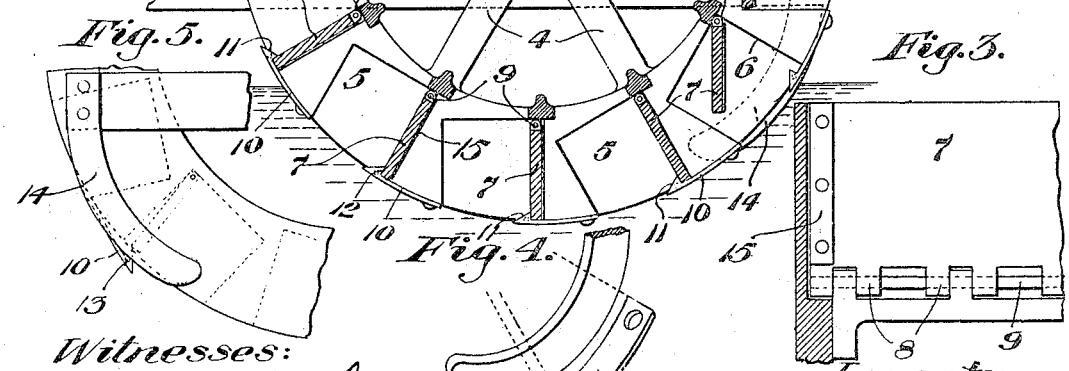
Witnesses:
Geo. W. MacKenzie Jr.
Chas. S. Fepley
Inventor:
George M. Welsh
by C. M. Clarke
atty.

UNITED STATES PATENT OFFICE.

GEORGE MORTIMERE WELSH, OF ALLEGHENY, PENNSYLVANIA.

PROPELLER-WHEEL.

No. 798,372.  Specification of Letters Patent.  Patented Aug. 29, 1905.

Application filed October 21, 1904. Serial No. 229,370.

*To all whom it may concern:*

Be it known that I, GEORGE MORTIMERE WELSH, a citizen of the United States, residing at Allegheny, in the county of Allegheny and State of Pennsylvania, have invented certain new and useful Improvements in Propeller-Wheels, of which the following is a specification, reference being had therein to the accompanying drawings, forming part of this specification, in which—

Figure 1 is a view in side elevation of my improved propeller-wheel. Fig. 2 is a cross-section on the line II II of Fig. 1. Fig. 3 is a detail view showing the hinged joint of one of the paddles. Figs. 4 and 5 are detail views of the latch-releasing device.

My invention refers to the class of propeller-wheels for steamboats, &c.; and it consists of an improvement in the paddles whereby they are maintained erected until about to merge from the water and then released and allowed to pass outwardly without offering resistance or carrying with them any water.

Referring to the drawings, 2 is the main shaft, provided with circular heads 3, carried by arms 4 or otherwise rigidly connected with the shaft. The heads are arranged in pairs and are provided with recesses 5 and bearing-ledges 6 to receive and support the paddles 7, which are hinged at 8 to any suitable pivoted supporting mechanism, as a rod 9.

10 represents spring-tongues secured around the periphery of the heads 3, as shown, provided with beveled terminals 11, having shoulders 12, the paddles being arranged to fall by gravity upon the seats during the revolution of the wheel, as at the lower left-hand portion of Fig. 2, and to be engaged by the beveled shouldered terminals which spring outwardly and back, firmly engaging the edges of the paddles. In this position the paddles are firmly held in a radial position, performing their required function against the water until somewhat past the point of the deepest immersion below the shaft. For the purpose of releasing the latches each one is provided with a pin or abutment 13, which rides under a curved stationary cam 14, forcing the spring-latch out of engagement and allowing the paddle to fall, as shown at the lower right side of Fig. 2 and in Fig. 5. The paddles are then pendent and pass around with the wheel until they again fall forwardly over their own center of gravity and are again engaged by the latches, as described.

Each paddle is preferably provided with a strip of bearing material 15, as leather, which prevents knocking and facilitates the operation of seating against the supporting-ledges 6. It will be understood that the paddles are of a suitable length to insure strength and that the bearing-ledges and securing-latches are provided at each end, as shown. The entire wheel may consist of a single circumferential series of paddles or of two or more such series arranged endwise, as in Fig. 1, in which case I prefer to locate the paddles of one series intermediate of the paddles of the adjacent series, thereby insuring regular action.

The invention will be found to greatly facilitate the operation of propeller-wheels of this class, giving the highest efficiency with a minimum of resistance, while the construction is simple and automatic in design and operation.

What I claim is—

1. A propeller-wheel having circular heads provided with a series of rectangular recesses providing flat paddle-bearings arranged to receive the paddles in opened and closed positions respectively, a series of pivotally-mounted paddles adapted to coöperate therewith, spring-latches therefor, and means for disengaging the latches, substantially as set forth.

2. A propeller-wheel having circular heads provided with a series of rectangular recesses providing flat paddle-bearings arranged to receive the paddles in opened and closed positions respectively, a series of pivotally-mounted paddles adapted to coöperate therewith, spring-latches therefor, having beveled terminals, shoulders, and releasing-abutments, with a stationary cam device adapted to engage said abutments to release the latch devices to permit the paddles to fall by gravity, substantially as set forth.

3. A propeller-wheel provided with a series of rectangular recesses providing flat paddle-bearings arranged to receive the paddles in opened and closed positions respectively, a series of pivotally-mounted paddles adapted to become seated against said bearings in opened and closed positions respectively, means for holding the paddles seated upon their bearings, and means for automatically releasing them therefrom, substantially as set forth.

4. A propeller-wheel provided with a series of rectangular recesses providing flat paddle-bearings arranged to receive the paddles in opened and closed positions respectively, a series of pivotally-mounted paddles adapted to become seated against said bearings in opened and closed positions respectively, bearing-strips for the paddles, means for holding the paddles seated upon their bearings, and means for automatically releasing them therefrom, substantially as set forth.

5. The combination with a wheel having a series of rectangular recesses providing paddle-bearings and pivotally-mounted paddles adapted to bear thereon, of spring-holding latches secured upon the peripheries of the wheel having beveled terminals and shoulders adapted to engage the edges of the paddles, and provided with projecting releasing-abutments, with a stationary cam adapted to engage said abutments to release the paddles, substantially as set forth.

In testimony whereof I affix my signature in presence of two witnesses.

GEORGE MORTIMERE WELSH.

Witnesses:
C. M. CLARKE,
R. H. McLARN.